United States Patent Office 3,066,031
Patented Nov. 27, 1962

3,066,031
CEMENTITIOUS MATERIAL AND METHOD OF PREPARATION THEREOF
Charles J. Schifferle, Walnut Creek, Calif., assignor to Joseph J. Coney, San Francisco, Calif.
No Drawing. Filed Oct. 21, 1959, Ser. No. 847,694
8 Claims. (Cl. 106—100)

This invention relates to hydraulic cement, and most particularly to the preparation of an excellent cementitious powder without fusing or hydrating the components of the cement. This application is a continuation-in-part of copending application Serial No. 598,994, filed July 20, 1956, now abandoned.

Conventional Portland cement is employed for almost all purposes in which a strong structural cement is required. It is prepared by mixing in the proper proportions the crushed components of the cement, which include silicon dioxide, calcium carbonate, aluminum oxide and ferric oxide. The resultant mixture is then generally pulverized by grinding until at least 85% by weight of the ground mixture passes through a 200 mesh sieve. The grinding step may be carried out either by the well known dry process grinding method, or by the conventional wet process in which the mixture is ground while in the form of a slurry.

After the mixture has been ground to the desired fineness, it is clinkered, or in other words heated in a kiln at a temperature sufficiently high to fuse the materials into the form of solid clinkers. Cement is formed by pulverizing the clinkers with any conventional grinding means. Usually, a small amount of retarder, such as gypsum, is added to the cementitious powder to prevent it from hardening too rapidly when the powder is mixed with water to form mortar or concrete.

The kiln in which the pulverized raw materials are formed into clinkers is the largest and most expensive equipment unit in a Portland cement plant. For example, a wet process rotary kiln built by Allis-Chalmers has a diameter of 11 ft. 6 in., a length of 475 ft., and a weight of 1,428,600 lbs. Unless the plant is large in capacity, the operation is unefficient. Not only is the kiln large and costly, but it is also the most expensive unit to operate in a cement plant. Great quantities of fuel are required by the kiln to convert the cement mixture into clinkers. Also, much of the fuel required in operation of the kiln is wasted due to heat lost when hot clinkers and hot gases are discharged from the kiln, and due to heat losses because of radiation from the kiln. It has been calculated that about 1,000,000 B.t.u. of heat is required to make one barrel (376 lbs.) of clinker. Furthermore, the cost of maintaining the kiln in operation is very great because of the necessity of making frequent repairs.

Consequently, the initial cost and the operating expenses of a kiln for forming clinkers are a large factor in the cost of Portland cement. Although there is currently a need for additional facilities for making cement and most Portland cement plants are operating at 100 percent of capacity, the expense of constructing a Portland cement plant serves as a deterrent to the erection of further plants. Another substantial factor in the price of cement is the cost of transporting the cement from the plant to the location where the concrete is to be formed. Cement is rarely distributed more than 200 miles from the plant because of high transportation costs. Although the greatest use of cement is generally in cities, kilns must be located away from cities or built-up areas because the clinkering step creates an air pollution problem.

Instead of Portland cement, a pozzolana cement is sometimes employed for structural purposes in which the strength of the cement need not be very great. Pozzolana cement is prepared from hydrated or in other words, slaked lime mixed with natural or artificial pozzolanic matter. The components of pozzolana cement are not fused or clinkered in order to prepare the cement, but they are merely mixed together and finely ground. As a result, this cement can be manufactured without a kiln for carrying out the expensive clinkering step employed in the manufacture of Portland cement. However, the usual pozzolana cement prepared with hydrated lime does not have the strength of Portland cement.

Summarizing this invention, a strong structural hydraulic cement is prepared by attrition grinding a dry mixture of calcium oxide, and a reactant containing silicon dioxide and aluminum oxide, until the calcium oxide has reacted to form chemical reaction products. The reaction effected by the grinding is complete when the mixture evolves a minor amount of heat upon hydration compared to the appreciable quantity of heat given off if the mixture is hydrated before it is thoroughly ground. When the ground composition is mixed with water, it sets to form a strong, hard cementitious article.

It has been found that the application of heat to the mixture increases the rate and completeness of the reaction between the calcium oxide and the reactant even though the temperature is maintained below the fusion point of the mixture. However, unless the calcium oxide and the reactant oxide are first intimately ground together to provide some reaction of the calcium oxide, temperatures lower than those that produce incipient fusion of the reactants do not effect the desired reaction. Usually, the heat evolved in grinding the components provides a reaction between the components in a reasonable period. However, if desired, the rate and completeness of the reaction can be enhanced by applying external heat to the mixture below the temperature of incipient fusion during or after the grinding operation. Even when the grinding provides an intimate mixture of fine particles with the calcium oxide only partially chemically reacted, the reaction is completed by the application of heat to the mixture.

Calcium oxide, or in other words quick lime, which is employed in the cement hereof, evolves a substantial amount of heat when it is hydrated in the free uncombined state, and it forms a mortar of very limited strength. However, when calcium oxide is ground with one of the specified oxides in the substantially dry state in accordance with this invention, a reaction surprisingly occurs between the components of the mixture during the grinding operation. As the attrition grinding of the mixture continues, the calcium oxide reacts and is no longer present in the free state, as evidenced by the decreasing amounts of heat given off upon hydration of portions of the mixture during the grinding operation. When very little immediate heat is evolved upon hydration of the ground mixture compared to the heat immediately evolved upon hydration of the same amount of lime, the reaction is complete.

The cement prepared by attrition grinding the cementitious mixture forms a very strong mortar when it is mixed with water. In accordance with customary procedure in the structural cement field, sand or gravel aggregate may be included to make concrete. The ultimate strength of concrete formed from such cement is comparable in every way to the strength of concrete formed from Portland cement.

Since the excellent cementitious material hereof is produced without clinkering the ground material in a kiln, there is no necessity of employing a clinkering kiln, which is very expensive to efficiently operate and costly to obtain. Small plants may be employed in the practice of this invention, whereas Portland cement plants must be large to be efficiently operated. Also, the air pollution problem caused by the clinkering step in the preparation of Portland cement is eliminated, and thus the cement plant employing the method of this invention can be located in a built-up area close to locations at which the cement is in greatest demand. Inasmuch as the cost of transportation for cement is very high due to its great weight, the ability to manufacture cement within the confines of a city is an important advantage. In addition, only one grinding step is required in the preparation of this cement, whereas Portland cement requires one grinding step before clinkering and another grinding operation after formation of clinkers. Consequently, cement can be produced by the method hereof at a much lower capital outlay and at a substantially lower operation cost than is possible with Portland cement.

Furthermore, it has been found that the cement prepared by the method hereof may be formed from a wider range of proportions and components than Portland cement, and yet a strong final product is obtained. For example, a strong structural cement has been made with a calcium oxide equivalent of as little as one-third the minimum amount commonly used in Portland cement. Since limestone is the most expensive component in the Portland cement, it is clear that a substantial reduction in the cost of the cement can be obtained by this feature of applicant's invention alone.

The cementitious material is prepared from raw materials that are readily available. The cement contains calcium oxide, commonly known as quick lime, which is available commercially or which is easily prepared from limestone, or in other words calcium carbonate. Limestone is readily available in many locations. It is not necessary to start with pure calcium carbonate or to purify the calcium oxide obtained from low grade calcium carbonate since the other materials present are either harmless or they are other reactants specified herein. When limestone is heated to more than about 1500° F. it decomposes into calcium oxide and carbon dioxide. The heating equipment required for preparing calcium oxide from limestone need not be nearly as elaborate as the kilns required for clinkering Portland cement, nor does such heating equipment require the large amount of fuel or costly expenditures for upkeep that are required by the kilns employed in preparing Portland cement. Simple furnaces suitable for converting limestone into calcium oxide are readily available and are well known in the art. For example, relatively small rotary kilns are sometimes employed for this purpose. Whereas clinkering in the manufacture of Portland cement requires temperatures in the order of about 2550° F. to 2950° F., temperatures between 1500° F. to 1800° F. may readily be used to convert calcium carbonate to calcium oxide for use in the cement hereof.

The reactants with which the calcium oxide are interground are generally not found in their pure state. However, they are often present as mixtures with the other reactants and with other compounds which may be interground with calcium oxide without purification or separation.

Silicon dioxide, commonly called silica, is also employed in the cement, and under the conditions hereof it combines with calcium oxide as a reactant. As is well known, there are many readily available sources of silica. For example, sand and pozzolanic materials such as pumicite and fly ash, contain a large amount of silica, and these raw materials are useful in forming the cement. Clays and shales also contain silica in useful proportions.

The aluminum oxide, or alumina, present in the cement is commonly found in clays and shales, which are present in most localities throughout the world. Consequently, there is no problem in obtaining a suitable supply of this material.

Iron oxide also may be incorporated in the cementitious material, although its presence is not essential. Usually some iron oxide is present in the raw materials employed as the source of the silicon dioxide or the aluminum oxide. Sources of iron oxide are well known in the cement industry since it is a common constituent of Portland cement. Mill scale, which is a by-product of steel mills may be employed as a source of iron oxide. Also iron ore deposits are located in various areas, and ferric oxide is a constituent of sand, clay and shales.

In addition substantial amounts of calcium carbonate or magnesium carbonate may be employed in the reactant and a suitable cement will still be produced. Calcium carbonate is readily available as limestone in many locations. The limestone need not be pure but may be a dolomitic material. Magnesium carbonate also is readily available along with other reactants in many raw materials.

Minor amounts of other metallic oxides found in the raw materials used as the source of the reactant silicon oxide, ferric oxide or aluminum oxide may be employed in the cement of this invention together with the specified oxides without affecting the ultimate strength of concrete formed from the cement. Examples of such oxides are manganese oxide and magnesium oxide, although the presence of these particular oxides is not advantageous.

The composition of the cement may vary widely without loss of strength in the resultant concrete product. In all cases the cement contains calcium oxide and a reactant mixture containing silicon dioxide and aluminum oxide. Fairly strong cements have even been made by the method hereof using calcium oxide and pure aluminum oxide as a reactant. However, best results in terms of increased strength of the ultimate concrete product are obtained when a reactant mixture of silicon dioxide and aluminum oxide is attrition ground with the calcium oxide.

Table I gives ranges of suitable and optimum compositions of non-volatile solids in the cement in terms of percentages by weight based upon the total weight of CaO, $SiO_2$, $Al_2O_3$, $Fe_2O_3$ and a carbonate selected from the group consisting of calcium, magnesium carbonate, and mixtures of such carbonates. The range marked "suitable" includes cements that need not produce an extremely strong concrete, whereas the "optimum" range provides a concrete of very high strength. However, it should be understood that the optimum amounts of the various components in the cement vary considerably depending upon the particular materials employed.

TABLE I

|  | Suitable | Optimum |
| --- | --- | --- |
| Calcium oxide | 5-75 | 50-65 |
| Silicon dioxide | 1-94 | 10-30 |
| Aluminum oxide | 1-94 | 5-30 |
| Iron oxide | 0-25 | 0-12 |
| Calcium carbonate and magnesium carbonate alone or together | 0-50 | 0-10 |

The range of proportions in percent by weight on the ignited basis generally employed for the manufacture of Portland cement is given in Table II. From this it can be seen that Portland cement is limited to a much smaller range of proportions than the cement prepared by the method hereof.

TABLE II

Calcium oxide _____ 60 – 67
Silicon dioxide _____ 17 – 25
Aluminum oxide _____ 3 – 8
Iron oxide _____ 0.5 – 6
Magnesium oxide _____ 0.1 – 5.0

Raw materials that contain a large proportion of compounds other than calcium oxide, silicon dioxide, aluminum oxide, iron oxide and calcium carbonate should preferably not be included to any substantial extent in the cementitious mixture before grinding unless they are chemically inert to all components under the conditions of the present method in which case they may be present in substantial amounts. The non-volatile solids in the mixture before attrition grinding should be composed of at least 80 percent of calcium oxide, silicon dioxide, aluminum oxide, iron oxide and a carbonate selected from the group consisting of calcium carbonate, magnesium carbonate and mixtures of such carbonates. For best results at least 90 percent of the mixture should be composed of such materials. Other non-volatile solids should compose less than 20 percent of the original mixture prior to grinding if they are reactive either during grinding or during formation of mortar or concrete.

Some raw materials may be mixed and ground alone with calcium oxide to prepare the cement hereof. However, in order to obtain the optimum proportions of reactants specified in Table I, it is usually necessary to mix more than one raw material with calcium oxide. Generally, the raw materials contain more than one reactant metal oxide. For example, a fly ash contains silicon dioxide, aluminum oxide, ferric oxide, calcium oxide and magnesium oxide. All of these compounds may go into the cement and they are included in the calculation of the total amount of each component present in the mixture. The amount of each raw material required to provide the desired cement composition is readily calculated from an analysis of the raw material, in accordance with proportioning procedure well known in the Portland cement art.

Even a small excess of unreacted lime in the final ground mixture substantially weakens the resultant cementitious mixture. If less calcium oxide is incorporated in the mixture than is required for complete reaction, the deterioration in the cementitious properties of the ground mixture is not nearly as great as when too much calcium oxide is employed, since the relatively inert excess amounts of unreacted silicon dioxide, aluminum dioxide or ferric oxide merely serve as aggregate in the cementitious product.

Before they are interground, the raw materials which contain the silicon dioxide, aluminum oxide and ferric oxide of the cementitious mixture are preferably employed in the form of small granules although this is not essential. For example, granules of 8 mesh A.S.T.M. standard size are suitable. Any conventional grinding means such as a tube mill or a ball mill, may be employed for the preliminary grinding of the raw materials. If they contain any substantial amount of moisture, the granules of the raw materials are dried to remove excess moisture that would interfere with the dry grinding step hereof and result in hydration of the calcium oxide. The free water that would be available to react with the calcium oxide should not be more than about 5 percent by weight of the entire mixture, and in any event the free water should not be more than about 10 percent by weight of the calcium oxide. Temperatures well below the melting points of the compounds are employed for the drying step, and a temperature between about 212° F. and 400° F. is well suited for this purpose.

After the dried granules have been proportioned and blended, the mixture is attrition ground while in the dry state. Grinding is continued until calcium oxide has reacted with the reactant. Completion of the reaction is evidenced by the almost entire elimination of immediate heat given off upon hydration of the ground mixture compared to heat evolved upon hydration of the components of the mixture or of the mixed materials before they are attrition ground. The grinding reduces substantially all of the mixture to a size below 200 mesh.

Any conventional grinding mill or series of mills may be employed for the attrition grinding step. For example, grinding mills suitable for use in this invention are employed for grinding clinkers in Portland cement. Ball mills and roll and ring mills, such as the Hercules mill, may be employed for rough grinding. Tube mills, compartment mills and ball mills are useful for attrition grinding the particles to a size substantially all well below 200 mesh and to provide the dry reaction between the components of the cement.

During the grinding step, a considerable amount of heat is evolved due to friction. Temperatures of about 500° F. are readily created by the grinding operation. Although this is far below the 2550° F. to 2950° F. range employed in the clinkering step for the manufacture of Portland cement, it has been found that such a temperature substantially promotes the desired reaction between the calcium oxide and the remaining metallic oxides in the cementitious mixture. Likewise, application of additional heat to the cementitious mixture hereof during or after attrition grinding to provide temperatures well below the fusion or softening temperatures, increases the degree and rate of formation of the reaction products. Temperatures from 300° F. to 800° F. are quite useful for this purpose. When the attrition grinding effects reaction of only part of the calcium oxide, the reaction may be completed by application of heat to the intimately ground mixture. Temperatures so high that the particles are softened and agglomerate are undesirable because additional grinding at a lower temperature is then required to reduce the pellets back into small particles. Thus, added heat is advantageous but not essential in preparation of the cement hereof. In any event for best results the reaction of the calcium oxide with the reactant should be continued until at least about 85 percent of the calcium oxide has reacted and is no longer present as free calcium oxide. However, it has been found that a satisfactory cement can be produced by intergrinding the mixture until only about 50 percent of the calcium oxide has reacted. Thus the process should be continued until between about 50 percent and 100 percent by weight of the calcium oxide has reacted.

If heat is employed to assist in the formation of cementitious reaction products, any simple means of applying the heat may be utilized. For example, the mill in which the mixture is ground may be heated with a flame from gas or oil burners. Such a flame is readily adjusted to provide a temperature rise well below the fusion or softening point of the components of the mixture.

The requisite duration of the attrition grinding operation and heating, if any, may be established by periodic tests of specimens from the mixture to determine the immediate heat of hydration of the specimen. As the grinding continues, more of the calcium oxide combines with the reactant oxides in the cement mixture, and the immediate heat of hydration correspondingly decreases. Also, the amount of heat given off upon hydration of an attrition ground mixture in which only a part of the calcium oxide has reacted, is decreased as the mixture is thereafter heated below the softening points of the components, and as the reaction of calcium oxide with the reactant continues.

The most accurate method of determining when the intergrinding reaction has been continued for a sufficient period and with sufficient intensity to provide a good cement is to calculate the amount of calcium oxide that has reacted. As previously discussed, between about 50 percent and 100 percent of the calcium oxide should be reacted to produce a suitable cement. This calculation can best be made by obtaining the immediate heat of hydration of the raw mixture before intergrinding and the immediate heat of hydration after intergrinding. These heats of hydration can then be employed to calculate the percent calcium oxide reacted by the following formula in which H represents the immediate heat of hydration:

Percent CaO reacted
$$= \frac{H \text{ of raw mixture} - H \text{ of ground mixture}}{H \text{ of raw mixture}} \times 100$$

A specific example of the calculation of immediate heats of hydration and of the percent calcium oxide reacted will be found in Example 5 herein.

An empirical method that can be used for determining the completeness of the reaction caused by the grinding is to place 200 grams of the cement blend in a well insulated container, add 200 cc. of water with stirring, and measure the temperature rise three minutes after adding the water. Before the grinding operation, the temperature rise of the sample in a three minute period is generally over 50° F. if the mixture contains the preferred amount of calcium oxide. However, after the grinding has been sufficiently completed to provide the desired reaction and an excellent cementitious product, the temperature rise of such a mixture is preferably less than about 20° F., and for best results it should rise less than one-fifth of the rise before grinding, or in other words less than about 10° F. However, this procedure is not particularly accurate, and the foregoing method of determining the percent of calcium oxide reacted by immediate heat of hydration measurements is more exact and therefore is preferred.

Periodical determinations of the percent calcium oxide reacted may be made on samples of the ground mixture during the grinding step to establish when the desired cementitious reaction product has been formed due to the attrition grinding. The time required to form the cementitious reaction product varies greatly depending upon the amount and physical structure of material processed and the method of grinding employed.

After the cementitious mixture has been ground to provide the desired reaction products, it is often mixed with an additive such as a retarder for controlling the rate at which the cement sets when it is mixed with water. Gypsum may be employed as a retarding agent, and it is advantageously used in the proportion of from 2½ to 5 percent by weight of the entire mixture. Since the cementitious product hereof sets quite rapidly, it is often desirable to include a more severe retarding agent than gypsum in the mixture. Examples of such retarding agents are tartaric acid, gluconic acid, citric acid, adipic acid, sucrose, cane sugar molasses residues, and lignosulfonates. Finely divided retarding agent is mixed with the cementitious material hereof by any conventional means. If desired, the retarder may be incorporated in the raw materials before the attrition grinding step, and it is then mixed during the grinding operation. Likewise, other additives employed with Portland cement, such as calcium chloride for accelerating the rate of hardening may be mixed with the cement hereof.

The resultant cement may be mixed with water "neat" without incorporating aggregate, and the mortar obtained thereby is exceptionally strong. Moreover, in order to provide more body, the cement may be mixed with aggregate as is customary in the Portland cement art. Both sand and coarse aggregates may be employed. The amount of aggregate depends upon the desired strength of the final concrete. Generally, from two to six parts by weight aggregate may be employed. At least sufficient water is intimately mixed with the cementitious powder to moisten and hydrate all of the cement. A water-cement range (weight of water divided by weight of cement) of from about 0.45 to 0.60 is preferable for many of the mixtures made by the method hereof, but this amount is not critical and varies with the materials which were interground as well as with the extent of grinding. The weight of the aggregate is not included in the calculation. The concrete product is weakened if excess water is employed in a quantity that provides a thin watery solution separated from the body of the wetted cementitious material.

The greatest advantage of the method hereof is in eliminating the expensive kiln and clinkering step heretofore thought essential in the manufacture of Portland type cement. As a result, the cost of the cement plant and its operation costs are greatly reduced. Furthermore, the dust given off in the clinkering step is substantially eliminated, and this renders the method suitable for use within the confines of a city.

The following are specific examples of the preparation of cement in accordance with this invention.

*Example 1*

A cementitious powder was prepared by mixing 100 parts by weight of 20 mesh pumicite with about 32 parts by weight of 20 mesh calcium oxide to provide a cement blend. Drying of the pumicite was not necessary since it contained only about 2 percent by weight moisture. The pumicite and the cement blend had the following composition in percent by weight.

| | CaO | SiO$_2$ | Al$_2$O$_3$ | Fe$_2$O$_3$ | MgO | Alk. | SO$_3$ | Misc. | Total |
|---|---|---|---|---|---|---|---|---|---|
| Pumicite | 0.88 | 69 | 15 | 1.3 | 0.90 | 1.3 | 1.3 | 10.32 | 100 |
| Cement blend | 25 | 51 | 11.2 | 0.97 | 0.67 | 0.97 | 0.97 | 9.22 | 100 |

The cement blend was attrition ground for one hour in a small ball mill composed of a rotating steel cylinder 24″ high by 24″ in diameter containing 1¼″ in diameter steel balls to serve as the crushing means. The resultant ground cementitious powder was substantially all less than 200 mesh in size.

Completion of the reaction between the calcium oxide and the other components of the cement was determined by a comparison of the heat evolved before attrition grinding the mixture with the heat given off after the intimate grinding operation. 200 grams of the cement blend was mixed before the grinding with 200 cc. of water in a well insulated glass-lined container. The temperature of the water before it was mixed with the cement was 70° F. Three minutes after the cement and water had been mixed, the temperature of the mixture rose to 126° F., or in other words, a temperature rise of 56° F. After the one hour grinding period, the identical test was repeated. The temperature of the water was 70° F. before mixing with the 200 cc. of cement blend. However, after the mixture of 200 cc. of water and 200 grams of ground cement had been mixed and allowed to stand for three minutes in the insulated container, the temperature was 78° F. or in other words, a rise of only 8° F. This clearly indicates that substantially all of the calcium oxide in the cement blend had reacted with other components of the cement during the grinding operation to form chemical reaction products that were different than free calcium oxide.

The attrition ground cement blend was then mixed with Ottawa sand, which is a standard aggregate for use in testing cements. One part by weight of the cementitious powder was employed with three parts by weight of sand. Water was added to provide a water-cement ratio $$\frac{\text{Water}}{\text{Cement}}$$

equal to 0.50.

Next the moistened cementitious mixture was cast by pouring it into a receptacle having 2 inch cubical shaped hollow interior sections, which is the size and type of mold commonly employed for making test mortar cubes. The resultant shaped cubes were cured in a moisture cabinet to form mortar cubes having the following compressive strength:

Pounds per sq. inch
Seven days' curing _____ 750
Fourteen days' curing _____ 1035
Twenty-eight days' curing _____ 1950
Sixty days' curing _____ 2700

Using the same cement blend mixed with Ottawa sand and water in the same proportions as above, 2 inch cubes were cast in the manner previously specified. However, the cubes were cured by steam instead of in a moisture cabinet. After steam curing the mortar cubes for six hours, the cubes had a compressive strength of about 1340 pounds per sq. inch. This establishes that a strong material can be formed from hydraulic cementitious powder prepared by the attrition grinding method of this invention without the usual clinkering step employed in the manufacture of Portland cement.

Example 2

In a method similar to that specified in Example 1, one hundred parts by weight of about 20 mesh fly ash was mixed with 39.3 parts by weight of about 20 mesh calcium oxide. The fly ash contained less than about 1 percent by weight moisture. Analysis of the fly ash and the resultant cement blend were as follows in percent by weight:

|  | CaO | SiO$_2$ | Al$_2$O$_3$ | Fe$_2$O$_3$ | MgO | SO$_3$ | Misc. | Total |
|---|---|---|---|---|---|---|---|---|
| Fly ash | 2.5 | 42 | 23 | 22 | 0.80 | 0.70 | 9 | 100 |
| Cement blend | 30 | 29.4 | 16.1 | 15.4 | 0.56 | 0.49 | 8.05 | 100 |

Attrition grinding of the blend was conducted in the ball mill described in Example 1 for a period of 50 minutes. For 25 minutes of the grinding time, the mill was heated by gas flame to provide an interior temperature of 500° F.

Before the grinding was commenced, a test of 200 grams of the mixture combined with 200 cc. of water in a well insulated container gave a temperature rise from 70° F. to 123° F., or in other words 53° F. after a three minute period. After attrition grinding for the 50 minute period, the ground cementitious material was allowed to cool to room temperature. 200 grams of the attrition ground material at 70° F. was mixed in the insulated container with 200 cc. of water at 70° F. and the temperature rise in three minutes was only to 78° F., or a rise of 8° F. Thus, it was apparent that substantially all of the free calcium oxide in the mixture had reacted during the attrition grinding.

A mixture of one part by weight of the cement powder with three parts by weight Ottawa sand using a water-cement weight ratio $$\frac{\text{Water}}{\text{Cement}}$$

of 0.52 was then cast in the form of 2 inch cubes as described in Example 1. After the cubes had set, half of them were steam cured for six hours. The steam cured cubes had a compressive strength of 3780 pounds per square inch. The remainder of the cubes were water cured. After twenty-eight days, the water cured cubes had a compressive strength of 3300 pounds per square inch.

Using the same cement "neat" without any aggregate, a water-cement ratio of 0.46, and steam curing the 2 inch cubes for six hours, the cured cubes had the very high compressive strength of 4290 pounds per square inch.

Example 3

A cementitious powder having the following composition was prepared by intermixing 20 mesh sand and clay with 20 mesh calcium oxide:

|  | CaO | SiO$_2$ | Al$_2$O$_3$ | Fe$_2$O$_3$ | MgO | Alk. | SO$_3$ | Misc. | Total |
|---|---|---|---|---|---|---|---|---|---|
| Cement blend | 63 | 23 | 5.5 | 2.0 | 0.70 | 0.68 | 1.3 | 3.82 | 100 |

Since the mixture of sand and clay contained about 8 percent by weight moisture, it was dried at 300° F. to a moisture content of 1.5 percent by weight before it was mixed with the calcium oxide.

The mixture was attrition ground in the manner described in Example 1 for a period of one hour and fifteen minutes. For the final thirty minutes of the grinding operation, the mill was heated externally with a gas flame to provide an internal temperature of 500° F.

Before the grinding operation, the test of mixing 200 grams of the blend with 200 cc. of water gave a temperature rise of from 70° F. to 208° F. in three minutes after combining the cement blend and water in the insulated container. This represents a temperature rise of 138° F. However, after the attrition grinding 200 grams of the ground blend mixed with 200 cc. of water gave a rise of from 70° F. to 82° F., or only 12° F. Again, the test clearly illustrated that a reaction occurred between the calcium oxide and the other components of the blend to form a cement.

As in the previous examples, 2 inch cubes were cast using one part by weight cement and three parts Ottawa sand. A water-cement weight ratio $$\frac{\text{Water}}{\text{Cement}}$$

of 0.60 was employed. Two inch cubes of the mixture cast as before and steam cured for six hours had a compressive strength of 1925 pounds per square inch. The same cast concrete cubes water cured had a compressive strength of 1400 pounds per square inch after 7 days, and a compressive strength of 2038 pounds per square inch after 14 days.

Using the same attrition ground cement blend "neat" without aggregate, two inch cubes were cast and steam cured for 6 hours. The resultant concrete blocks had a compressive strength of 3300 pounds per square inch.

Example 4

A cement mixture was prepared of 20 mesh pure calcium oxide and powdered chemically pure dry aluminum oxide having the following proportions:

|  | CaO | Al$_2$O$_3$ | Total |
|---|---|---|---|
| Cement Blend | 30 | 70 | 100 |

The blend was ground in the ball mill described in Example 1 for 40 minutes. During the last 30 minutes of the grinding operation, the mill was heated externally with a gas flame to provide an interior temperature of 500° F.

Prior to the grinding operation, 200 grams of the blend mixed with 200 cc. of water in an insulated container gave a temperature rise from 70° F. to 116° F. in 3 minutes. After the attrition grinding, a rise of from 70° F. to only 74° F. was observed upon repeating the test. This indicated that the reaction between the calcium oxide and aluminum oxide caused by the attrition grinding was substantially complete.

Two inch cubes were cast using the cement blend and Ottawa sand in the proportion of one part cement blend to three parts Ottawa sand. A water cement weight ratio $$\frac{\text{Water}}{\text{Cement}}$$

of 0.60 was employed and the cubes were air dried. The compressive strength of the cubes was 522 pounds per square inch in seven days.

Using the same cement blend, two inch cubes were cast "neat" without aggregate. The water cement ratio $$\frac{\text{Water}}{\text{Cement}}$$

was 0.52. When the resultant cubes were steam cured for 6 hours, they had a compressive strength of 1232 pounds per square inch.

Example 5

A mixture was prepared of 1¼ parts kaolin clay, 1¼ parts Cowell sand and 2½ parts of calcium oxide. The clay contained about 35 percent aluminum oxide, 48 percent silicon dioxide, 13 percent water and 4 percent alkaline and undetermined materials. The sand contained 85.75 percent silicon dioxide, 11.48 percent aluminum oxide, 1.86 percent of other oxides, and the remainder undetermined materials.

This mixture of raw materials was ground in a ball mill for 10 hours after which physical measurements were made and the amount of calcium oxide reacted was determined. The ground mixture had a specific gravity of 2.59, a Blaine air-permeability fineness of 6420 cm.$^2$/g., a loss upon ignition at 1800° F. in percent by weight of 9.07 which includes a $CO_2$ content of 1.10 percent, a free or surface moisture content of about 1.8 percent by weight and about 6.2 percent of clay-lattice water removable only at temperatures above approximately 650° C.

The amount of calcium oxide reacted was calculated as follows: The 4 minute and 15 minute heat capacities of the calorimeter, thermometer and 50 g. water was determined by a procedure well known in the art.

The 4 minute heat capacity of the calorimeter, thermometer and water was 65.2 Cal. and the 15 minute heat capacity was 69.3 Cal. Next, the initial Beckman thermometer temperature of the water in the calorimeter was observed and a sample weighing 6.82644 grams was introduced into the calorimeter. The maximum temperature was thereafter observed both for the first 4 minute period, and also for the first 15 minute period.

The immediate heats of hydration are calculated using the following formula in which the heat taken up by the cementitious mixture is not considered because of its minor effect on the final calculation of percent calcium oxide reacted. H represents the immediate heat of hydration in calories per gram of sample.

$$H = \frac{(\text{max. temp.} - \text{initial temp.}, °C.)(\text{calorimeter heat capacity})}{\text{Sample wt., g.}}$$

$$4 \text{ min. H ground} = \frac{(1.105 - 0.050)(65.2)}{6.82644} = 5.8 \text{ Cal./g.}$$

$$15 \text{ min. H ground} = \frac{(2.61 - 0.50)(69.3)}{6.82644} = 21.4 \text{ Cal./g.}$$

By the same procedure and method of calculation, the immediate heats of hydration for the mechanically mixed unground raw materials in correct proportion were determined for 4 and 15 minute periods.

4 min. H unground = 82.6 Cal./g.
15 min. H unground = 139 Cal./g.

Next the percent calcium oxide was calculated as follows:

$$\text{Percent CaO reacted} = \frac{H \text{ unground} - H \text{ ground}}{H \text{ unground}} \times 100$$

$$\text{Percent CaO reacted (4 min. test)} = \frac{82.6 - 5.8}{82.6} \times 100 = 93.0\%$$

$$\text{Percent CaO reacted (15 min. test)} = \frac{139 - 21.4}{139} \times 100 = 84.6\%$$

The purpose of obtained both 4 and 15 minute heats of hydration and of calculating the percent calcium oxide reacted on both bases is to provide information with respect to the rate of hydration and the true magnitude of reacted calcium oxide, both of which vary with composition and degree of grinding.

The cementitious mixture interground to the extent specified above was mixed with sand in the proportion of 1 part cement to 2.75 parts sand, and then mixed with .38 part water. This mixture was placed in cubical molds to form two inch plastic mortar cubes. The materials and procedure followed were all in accordance with ASTM standard procedures. The molds and contents were stored at 70° F. and 100 percent relative humidity for 1 day. Specimens were thereafter stripped and stored at 100 percent relative humidity and at a temperature of 70° F.

Tests of compressive strengths of three cubes were made at 3 days, and of three other cubes at 7 days. The 3 day strength was 1280 pounds per square inch, and the 7 day strength was 1540 pounds per square inch.

*Example 6*

An unground mixture identical in proportions and composition to the mixture in Example 5 was employed in this example except that the clay and sand were oven dried before they were interground with the calcium oxide. The mixture was ball milled for 15 hours.

After this intergrinding, the specific gravity of the mixture was 2.72, the Blaine fineness was 6350 cm.$^2$/g., the ignition loss at 1800° F. was 6.53 percent by weight and the $CO_2$ content was 0.38. Hence the clay-lattice water was about 6.1 percent.

Calculations of the amount calcium oxide reacted showed 78.3 percent reacted by the 4 minute immediate-heat-of-hydration test, and 71.9 percent by the 15 minute test.

Compressive tests of plastic-mortar cubes made with this cement by the method specified in Example 5 showed a 3 day strength of 1910 pounds per square inch and a 7 day strength of 2470 pounds per square inch.

*Example 7*

A mixture of 2½ pounds Monterey shale and 2½ pounds of calcium oxide was ground by ball milling for 10 hours. The Monterey shale had the following analysis:

| $SiO_2$ | $Al_2O_3$ | $Fe_2O_3$ | CaO | MgO | $Na_2O$ | $K_2O$ | Loss on Ignition | Carbonate $CO_2$ |
|---|---|---|---|---|---|---|---|---|
| 75.52 | 9.87 | 2.87 | 2.31 | 0.57 | 0.81 | 1.21 | 6.68 | 1.42 |

After the intergrinding has been completed the resultant cementitious powder had a specific gravity of 2.56, a Blaine air permeability fineness of 6,000 cm.$^2$/g., an ignition loss at 1800° F. of 7.79 percent by weight, and a $CO_2$ content of 1.21 percent by weight.

In order to determine the percent of calcium oxide reacted during the intergrinding procedure, the heat of hydration both of the unground mixture and of the ground mixture were determined in the same manner as in Example 5. It was found that the 4 minute immediate-heat-of-hydration test indicated that 82.5 percent of the calcium oxide had reacted, and the 15 minute immediate-heat-of-hydration test indicated that 83.8 percent of the calcium oxide had reacted.

Plastic mortar cubes were prepared from the cementitious powder in the same manner as in Example 5. After curing, the 3 day compressive strength of the cube was 895 pounds per square inch, and the 7 day strength 1,534 pounds per square inch.

*Example 8*

The exact procedure of Example 7 was followed except that 2½ pounds of celite (diatomaceous earth) was employed in place of Monterey shale. The diatomaceous earth had the following analysis:

| $SiO_2$ | $Al_2O_3$ | $Fe_2O_3$ | CaO | MgO | Loss on ignition |
|---|---|---|---|---|---|
| 80.29 | 11.91 | 1.78 | 0.76 | 0.15 | 2.43 |

The specific gravity after 10 hours of ball milling was 2.30, the Blaine air permeability fineness was 6,610 cm.$^2$/g., the ignition loss at 1800° F. was 8.98 percent by weight, and the $CO_2$ content was 0.78 percent by weight.

Calculations of the amount of calcium oxide reacted, based on the 4 minute immediate-heat-of-hydration, gave a value of 85.8 percent, and the 15 minute immediate-heat-of-hydration showed that 84.5 percent by weight of the calcium oxide had reacted.

The cementitious powder was formed into plastic mortar cubes by the method described in Example 5 and subsequently tested for strength. The 3 day compressive strength was 1509 pounds per square inch and the 7 day strength 2538 pounds per square inch.

I claim:

1. The method of preparing a hydraulic cement without requiring clinkering of the components which comprises attrition grinding in the dry state and in the presence of each other a mixture containing as essential ingredients (A) from about 5 to 75 percent by weight of unreacted calcium oxide, and (B) from 95 to 25 percent of a reactant for said calcium oxide composed essentially of a mixture of silicon dioxide and aluminum oxides, the reactive nonvolatile solids of said mixture being composed of at least 80 percent by weight of said (A) and (B), and continuing such grinding until at least 50 percent by weight of such calcium oxide has reacted due to the grinding as determined by the immediate heat of hydration of said ground mixture, the hydraulic cementitious properties of said ground mixture being substantially entirely imparted by said grinding of said (A) and (B).

2. The method of claim 1 in which said reactant (B) includes iron oxide.

3. The method of claim 1 in which said reactant (B) includes a carbonate selected from the group consisting of calcium carbonate, magnesium carbonate, and mixtures of such carbonates.

4. A hydraulic cement substantially entirely below 200 mesh in size prepared by the method of claim 1.

5. The method of preparing a hydraulic cement without requiring clinkering of the components, which comprises attrition grinding in the dry state and in the presence of each other the ingredients of a mixture containing essentially as reactive ingredients from 5 to 75 percent by weight unreacted calcium oxide, from 1 to 94 percent by weight silicon dioxide, from 1 to 94 percent by weight aluminum oxide, up to 25 percent by weight iron oxide, and up to 50 percent by weight of a carbonate selected from the group consisting of calcium carbonate, magnesium carbonate, and mixtures of such carbonates; continuing such grinding until at least 50 percent by weight of the calcium oxide has reacted due to the grinding as determined by the immediate heat of hydration of said ground mixture, the hydraulic cementitious properties of said ground mixture being substantially entirely imparted by the grinding of said reactive ingredients.

6. The method of preparing a hydraulic cement without requiring the clinkering of the components, which comprises attrition grinding in a dry state and in the presence of each other, the ingredients of a mixture in which at least 80 percent by weight of the reactive non-volatile solids are composed essentially of about 50 to 65 percent by weight unreacted calcium oxide and, as reactant therefor, from about 10 to 30 percent by weight silicon dioxide unreacted with calcium oxide, from about 5 to 30 percent by weight aluminum oxide unreacted with calcium oxide, up to about 12 percent by weight iron oxide unreacted with calcium oxide, and up to about 50 percent of a carbonate selected from the group consisting of calcium carbonate, magnesium carbonate and mixtures of such carbonates; and continuing such grinding at a temperature below the fusion point and clinkering temperature of all of the components of the mixture until at least about 50 percent of the calcium oxide has reacted due to the grinding.

7. The method of preparing a hydraulic cement without requiring clinkering of the components, which comprises attrition grinding in the dry state and in the presence of each other, the ingredients of a mixture in which at least 80 percent of the non-volatile solids are composed essentially of (A) from 5 to 75 percent by weight calcium oxide and (B) as a reactant therefor, from 1 to 94 percent by weight silicon dioxide unreacted with calcium oxide, from 1 to 94 percent by weight aluminum oxide unreacted with calcium oxide, up to 25 percent by weight iron oxide unreacted with calcium oxide, and up to 50 percent by weight of a carbonate selected from the group consisting of calcium carbonate, magnesium carbonate, and mixtures of such carbonates, continuing such grinding at a temperature below the fusion point and clinkering temperature of all of the components of the mixture until calcium oxide has reacted to produce chemical reaction products; and subjecting the ground mixture to external heat at an elevated temperature above about 300° F. and below the fusion point and clinkering temperature of all of the components of said mixture until the effect of such grinding and temperature causes at least about 50 percent of the calcium oxide to react.

8. The method of preparing a cementitious powder without requiring clinkering of the components and which is capable of forming a strong cement when mixed with water, comprising attrition grinding in substantially dry state and in the presence of each other a mixture containing as essential ingredients (A) from about 5 to 75 percent by weight of unreacted calcium oxide, and (B) from about 95 to 25 percent by weight of a reactant for the calcium oxide composed essentially of silicon dioxide and aluminum oxides as active ingredients, the reactive non-volatile solids in said mixture being composed of at least 80 percent by weight of said (A) and (B), and continuing said attrition grinding to effect said reaction between (A) and (B) until at least 50 percent by weight of said calcium oxide has reacted due to the grinding as determined by the immediate heat of hydration of said ground mixture, said reaction effected by said attrition grinding occurring independent of application of external heat whereby the cementitious properties of said ground mitxure are substantially entirely imparted by said grinding of (A) and (B).

References Cited in the file of this patent

UNITED STATES PATENTS

| | | |
|---|---|---|
| 311,156 | Walker | Jan. 20, 1885 |
| 584,397 | Nahnsen | June 15, 1897 |
| 706,760 | Knox | Aug. 12, 1902 |
| 1,264,747 | Anneke | Apr. 30, 1918 |
| 1,594,178 | Kuhl | July 27, 1926 |
| 1,997,782 | Windecku | Apr. 16, 1935 |
| 2,006,939 | Buerwood | July 2, 1935 |
| 2,083,179 | Work | June 8, 1937 |
| 2,227,790 | Moreton | Jan. 7, 1941 |

UNITED STATES PATENT OFFICE
CERTIFICATE OF CORRECTION

Patent No. 3,066,031            November 27, 1962

Charles J. Schifferle

It is hereby certified that error appears in the above numbered patent requiring correction and that the said Letters Patent should read as corrected below.

Column 11, line 40, for "0.050" read -- 0.50 --.

Signed and sealed this 28th day of May 1963.

(SEAL)
Attest:

ERNEST W. SWIDER
Attesting Officer

DAVID L. LADD
Commissioner of Patents